United States Patent [19]

Meyer et al.

[11] 4,294,881
[45] Oct. 13, 1981

[54] COATED GLASS ARTICLE

[75] Inventors: John H. Meyer, Milford; Salvatore Guerra, Detroit, both of Mich.

[73] Assignee: Ford Motor Company, Dearborn, Mich.

[21] Appl. No.: 165,427

[22] Filed: Jul. 2, 1980

[51] Int. Cl.³ .................. B32B 17/06; B32B 27/20; B32B 27/30
[52] U.S. Cl. .................................. 428/334; 428/335; 428/426; 428/432; 428/437
[58] Field of Search ............... 428/437, 432, 426, 334, 428/335

[56] References Cited

U.S. PATENT DOCUMENTS

| | | | |
|---|---|---|---|
| 3,411,934 | 11/1968 | Englehart | 428/432 |
| 3,694,299 | 9/1972 | Wagner | 428/432 |
| 3,984,591 | 10/1976 | Plumat | 428/432 |
| 4,101,705 | 7/1978 | Fischer | 428/437 |
| 4,217,392 | 8/1980 | Vong | 428/432 |

Primary Examiner—Ellis P. Robinson
Attorney, Agent, or Firm—William E. Johnson; Olin B. Johnson

[57] ABSTRACT

A new article of manufacture is disclosed. This article includes a glass substrate having at least first and second surfaces. A coating is placed on at least a portion of one surface of the glass substrate. The coating has a thickness in a range from about 70 angstroms to about 120 angstroms. The coating consists, on a mixed metal oxide weight basis, of about 60 to 70% cobalt, 12 to 18% chromium, and 16 to 24% iron. A protective layer is placed over the coating.

12 Claims, No Drawings

COATED GLASS ARTICLE

BACKGROUND OF THE INVENTION AND PRIOR ART STATEMENT

It is well known to the skilled artisan that a metal oxide coating placed on a glass substrate will, in most instances, change the amount of light transmitted through the glass substrate, and also will change the color of the glass substrate when viewed. The metal oxide coating on the surface of the glass will also change the chracteristics of the way in which light is reflected from the coated surface.

In general, these coated glass articles are manufactured by spraying a solution of mixed metal acetylacetonates onto a heated glass substrate. The glass substrate must be heated to a temperature sufficient to cause volatilization of the organic portion of the sprayed solution so that the coating left behind is that of the oxides of the various metals making up the spray solution. It is also generally well known in the art that the thickness of the coating on the glass substrate is in the range of from about 400 angstroms to about 500 angstroms in order to get a uniformity in the coating that provides the required coloration and, also, which provides to the glass substrate the desired transmission and reflectance characteristics.

U.S. Pat. Nos. 3,296,004 and 4,101,705 disclose identical glass compositions of a so-called neutral bronze color. Neutral bronze glass having a transmission level above 70% is now marketed in the European countries for automotive applications. Stylists in the United States are also looking at this color as a potential color for use in automotive glazings. Both of the mentioned patents, however, develop this particular color by putting the coloring elements in the glass composition itself. Such a color is generally defined as a body colored glass.

SUMMARY OF THE INVENTION

It is a principal object of this invention to provide as a new article of manufacture a glass substrate upon which a coating is placed in order to develop for the glass substrate a pleasing netural bronze color.

In accordance with the teachings of this invention, a new article of manufacture is formed as follows. A glass substrate is selected which has at least first and second surfaces. A coating is placed on at least a portion of one surface of the glass substrate. This coating has a thickness in a range from about 70 angstroms to about 120 angstroms, preferably from about 75 angstroms to 110 angstroms, and most preferably in a range from about 80 angstroms to 100 angstroms. The coating consists, on a mixed metal oxide weight basis, of about 60 to 70% cobalt, 12 to 18% chromium, and 16 to 24% iron, preferably from about 63 to 68% cobalt, 14 to 16% chromium; and 17 to 20% iron, and most preferably from about 65 to 66% cobalt, 14.5 to 15.5% chromium, and 18.5 to 19.5% iron. A protective layer is placed over the coating.

In accordance with preferred teachings of this invention, the glass substrate is formed of a basic soda/lime glass composition. This soda/lime glass composition can be a clear glass composition.

Also, in accordance with the preferred teachings of this invention, the protective layer is formed from a laminating plastic interlayer in contact with the coating on the glass substrate along with a second substrate contacting the laminating plastic interlayer.

DESCRIPTION OF THE PREFERRED EMBODIMENT

The novel features that are considered characteristic of the invention are set forth with particularity in the appended claims. The invention itself, however, both as to its organization and its method of operation, together with additional objects and advantages thereof, will best be understood from the foregoing description of specific embodiments.

U.S. Pat. Nos. 3,296,004 and 4,101,705 contain overlapping teachings with regard to the manufacture of a neutral bronze color glass. The glass composition taught in these patents is a so-called body colored glass in that the color extends through the entire thickness of the glass. With the same amount of colorant materials in the glass composition, as the thickness of the glass increases, the color darkens and the transmission level decreases. The colorant materials needed to obtain the particular neutral bronze color are iron, selenium and cobalt. Specific proportions of the colorant materials are added to an otherwise standard basic soda/lime silica glass composition and melted in order to generate the desired glass composition.

If one is manufacturing a glass composition without any color in it, it takes a period of several days in order to introduce the proper amount of colorant materials into the continuous processes of refining large quantities of glass on a commercial basis. Thus, for a period of several days, while the color characteristics of the glass being manufactured are changing from clear to bronze, the glass is of an undesired color and thus useless as far as being a product which is saleable on the open market. Thus, in order to make a body colored glass, there is some loss of glass while one is changing from a first color to a second color such as the neutral bronze and then changing back from that neutral bronze to yet another color.

The article of this invention is one which can be produced without long lead times and a gradual changing of colorant materials which are added to a glass melting chamber. A neutral bronze colored glass article may be achieved by developing a particular thickness range of a particular combination of colorant metal oxides on the surface of an otherwise uniformly colored glass substrate. For example, the colorant oxides may be developed on the surface of a clear ribbon of glass simply by spraying colorant oxide producing materials against the surface of the clear glass sheet when the sheet is at an elevated temperature sufficient to cause the sprayed materials to break down into their oxide form. In such a manner, the desired color may be achieved simply by turning on a spraying apparatus to apply the proper metal containing solution against the surface of a heated glass sheet. When the required number of square feet of such a product have been produced, the spraying apparatus is turned off and once again the glass ribbon being produced reverts immediately to its former color characteristics.

The above-described process for developing a coating on a glass substrate is already well known in the art. However, in general, the art teaches that the coating placed on the glass substrate must have a thickness in a range from about 400 angstroms to about 500 angstroms in order to get a uniformity in the coating that provides the required coloration on an even basis along the length and the width of the substrate. Such a relatively thick coating generally produces a glass article which has a transmission capability below 70%, the level which is required for automotive glass being above 70% transmission. We found, however, that if one attempted to reduce the thickness of the applied metal oxide layer, the film generally did not apply to the glass in a uniform manner, but rather was mottled in appearance. Some areas of the glass were darker in color than other areas and, in general, the overall resultant product was of poor quality.

We continued our work in this area and found that if the thickness of the coating was reduced to a relatively thin dimension, as compared to previously used thicknesses, the coloration developed on the glass substrate is generally of uniform and acceptable quality. The particular thickness range that we found to be suitable is set forth hereinbelow. When this thickness range is used, the coating on the surface of the glass is of uniform thickness and it provides a uniform coloration to the glass. This uniform coloration gives a product having transmission capabilities above 70% and, therefore, is suitable for use as an automotive glass product. If one places film thicknesses on a glass ribbon thicker than the range noted hereinbelow, the film will be generally mottled and of non-uniform character until a thickness of 400 to 500 angstroms is reached. If one places a film thickness below that to be described, the film generally does not change the transmission characteristics of the glass sufficiently to warrant application of such film.

In accordance with the general teachings of this invention, a new article of manufacture is achieved as follows. A glass substrate is used which has at least first and second surfaces. A coating is placed on at least a portion of one surface of the glass substrate. This coating has a thickness in a range from about 70 angstroms to about 120 angstroms, preferably from about 75 to 110 angstroms, and more preferably from about 80 to about 100 angstroms. This coating consists, on a mixed metal oxide weight basis, of about 60 to 70% cobalt, 12 to 18% chromium, and 16 to 24% iron, preferably from 63 to 68% cobalt, from 14 to 16% chromium, and from 17 to 20% iron, and more preferably from 65 to 66% cobalt, from 14.5 to 15.5% chromium, and 18.5 to 19.5% iron.

Because of the relative thinness of this coating, it generally will not pass standardized durability testing procedures used in the industry for testing coatings applied to the surface of a glass substrate. These coatings are generally tested by being subjected to a mist of hydrochloric acid in one test, or a high humidity for a prolonged period of time in another test. In order to pass such tests, it is necessary to provide a protective layer over the coating. The protective layer may take many forms, for example, a clear resinous coating of any of the protective resinous materials well known to a skilled artisan. In a preferred embodiment, the protective layer is formed from a laminating plastic interlayer which is in contact with the coating, and a second glass substrate contacting the laminating plastic interlayer. In this manner, one could form a windshield of laminated construction, if desired.

In accordance with further detailed teachings of particular embodiments of this invention, the glass substrate can be formed of a basic soda/lime/silica glass composition. In a more preferred embodiment, such a soda/lime/silica glass composition could have a clear color.

EXAMPLE

A known standard composition of a basic soda/lime/silica glass composition is melted in a glass melting chamber. This melted glass is delivered by means of a canal to a float bath chamber in which the glass is permitted to flow out upon a molten bath. A glass ribbon thus formed moves along the length of the float bath to an exit end of the bath whereat it has been formed to a sheet of glass. This sheet of glass will have a temperature in a range of 1040° F. to 1150° F. when it exits from the float bath chamber.

In accordance with the teachings of this invention, the float glass being manufactured is of clear composition. As the float glass exits from the float glass chamber, and prior to its entry into an annealing lehr, a chemical solution of metal acetylacetonates is sprayed onto the surface of the glass. The heated glass causes the organic portion of the solution to volatilize and permits the metallic portions thereof to be deposited as oxides upon the ribbon of glass.

The solution sprayed upon the glass has the following weight percents of materials making up the solution: cobalt acetylacetonate—8.44%; iron acetylacetonate—2.44%; chromium acetylacetonate—1.62%; and dichlorolmethane—the balance. This solution is sprayed at a rate of about eight gallons of solution per hour onto a 3/32 inch thick float glass ribbon moving at a rate of 525 inches per minute underneath the gun applying the solution. The spray gun is spaced at a height of ten inches above the surface being coated.

The coating developed upon the ribbon has the following composition on a mixed metal oxide weight basis: cobalt—65.85%; chromium—15.05%; and iron—19.10%. The film thickness is about 90 angstroms.

An individual glass bracket is cut from the ribbon manufactured in this method. A polyvinylbutyral laminating interlayer is placed upon the glass in contact with the face of the glass having the metal oxide coating thereon. A second glass sheet is brought into contact with the free surface of the laminating interlayer. The plain glass sheet, the coated glass sheet, and the laminating interlayer are then laminated in a standard glass laminating operation into a single glass unit. This produces an article in accordance with the teachings of this invention.

While a particular example of an article of this invention has been illustrated, and while the general details of articles which fall within this invention have been described, it will be obvious to those skilled in the art that various changes and modifications may be made without departing from the invention, and it is intended to cover in the appended claims all such modifications and equivalents as fall within the true spirit and scope of this invention.

What is claimed is:

1. As an article of manufacture having transmission capabilites above 70%;
    a glass substrate having at least first and second surfaces;
    a coating on at least a portion of one surface of said glass substrate, said coating having a thickness in a range from about 70 angstroms to about 120 angstroms, said coating consisting, on a mixed metal oxide weight basis, of about 60 to 70% cobalt, 12 to 18% chromium, and 16 to 24% iron; and
    a protective layer over said coating.

2. The article of claim 1 wherein said glass substrate is formed of a basic soda/lime glass composition.

3. The article of claim 2 wherein said soda/lime glass composition is a clear glass composition.

4. The article of claim 1 wherein said protective layer is formed from a laminating plastic interlayer in contact with said coating and a second glass substrate contacting said laminating plastic interlayer.

5. As an article of manufacture having transmission capabilities above 70%;
   a glass substrate having at least first and second surfaces
   a coating on at least a portion of one surface of said glass substrate, said coating having a thickness in a range from about 75 angstroms to about 110 angstroms, said coating consisting, on a mixed metal oxide weight basis, of about 63 to 68% cobalt, 14 to 16% chromium, and 17 to 20% iron; and
   a protective layer over said coating.

6. The article of claim 5 wherein said glass substrate is formed of a basic soda/lime glass composition.

7. The article of claim 6 wherein said soda/lime glass composition is a clear glass composition.

8. The article of claim 5 wherein said protective layer is formed from a laminating plastic interlayer in contact with said coating and a second glass substrate contacting said laminating plastic interlayer.

9. As an article of manufacture having transmission capabilities above 70%;
   a glass substrate having at least first and second surfaces;
   a coating on at least a portion of one surface of said glass substrate, said coating having a thickness in a range from about 80 angstroms to about 100 angstroms, said coating consisting, on a mixed metal oxide weight basis, of about 65 to 66% cobalt, 14.5 to 15.5% chromium, and 18.5 to 19.5% iron; and
   a protective layer over said coating.

10. The article of claim 9 wherein said glass substrate is formed of a basic soda/lime glass composition.

11. The article of claim 10 wherein said soda/lime glass composition is a clear glass composition.

12. The article of claim 9 wherein said protective layer is formed from a laminating plastic interlayer in contact with said coating and a second glass substrate contacting said laminating plastic interlayer.

* * * * *